(12) United States Patent
Neill et al.

(10) Patent No.: US 9,074,092 B2
(45) Date of Patent: Jul. 7, 2015

(54) MISCIBLE POLYESTER BLENDS UTILIZING RECYCLED POLYESTERS

(75) Inventors: Ryan Thomas Neill, Kingsport, TN (US); Michael Eugene Donelson, Kingsport, TN (US); Bryan Steven Bishop, Kingsport, TN (US); James Collins Maine, Church Hill, TN (US); Wesley Raymond Hale, Kingsport, TN (US)

(73) Assignee: EASTMAN CHEMICAL COMPANY, Kingsport, TN (US)

(*) Notice: Subject to any disclaimer, the term of this patent is extended or adjusted under 35 U.S.C. 154(b) by 445 days.

(21) Appl. No.: 12/973,270

(22) Filed: Dec. 20, 2010

(65) Prior Publication Data

US 2012/0157636 A1    Jun. 21, 2012

(51) Int. Cl.
| | | |
|---|---|---|
| *C08G 63/00* | (2006.01) | |
| *C08L 67/02* | (2006.01) | |
| *B32B 27/06* | (2006.01) | |
| *B32B 27/36* | (2006.01) | |

(52) U.S. Cl.
CPC ............... *C08L 67/02* (2013.01); *B32B 27/06* (2013.01); *B32B 27/36* (2013.01); *B32B 2270/00* (2013.01)

(58) Field of Classification Search
None
See application file for complete search history.

(56) References Cited

U.S. PATENT DOCUMENTS

| | | |
|---|---|---|
| 2,991,273 A | 7/1961 | Hechelhammer et al. |
| 2,999,835 A | 9/1961 | Goldberg |
| 2,999,846 A | 9/1961 | Schnell et al. |
| 3,028,365 A | 4/1962 | Schnell et al. |
| 3,148,172 A | 9/1964 | Fox |
| 3,153,008 A | 10/1964 | Fox |
| 3,271,367 A | 9/1966 | Schnell et al. |
| 4,025,492 A | 5/1977 | Binsack et al. |
| 4,123,436 A | 10/1978 | Holub et al. |
| 4,136,089 A | 1/1979 | Bier et al. |
| 4,188,314 A | 2/1980 | Fox et al. |
| 4,208,527 A | 6/1980 | Horlbeck et al. |
| 4,238,593 A | 12/1980 | Duh |
| 4,263,364 A | 4/1981 | Seymour et al. |
| 4,391,954 A | 7/1983 | Scott |
| 4,786,692 A | 11/1988 | Allen et al. |
| 4,982,014 A | 1/1991 | Freitag et al. |
| 5,010,162 A | 4/1991 | Serini et al. |
| 5,134,201 A | 7/1992 | Billovits et al. |
| 5,162,416 A | 11/1992 | Udipi |
| 5,382,628 A | 1/1995 | Stewart et al. |
| 5,478,896 A | 12/1995 | Scott |
| 5,582,788 A | 12/1996 | Collette et al. |

(Continued)

FOREIGN PATENT DOCUMENTS

| | | |
|---|---|---|
| EP | 0596872 A2 | 5/1994 |
| EP | 0666285 A1 | 8/1995 |

(Continued)

OTHER PUBLICATIONS

Wilfong, R.E., "Linear Polyesters," Journal of Polymer Science, 1961, pp. 385-410, vol. 54.

(Continued)

*Primary Examiner* — Alicia Bland
(74) *Attorney, Agent, or Firm* — Betty J. Boshears (57) ABSTRACT

Polyester blends containing recycled, post-consumer polyethylene terephthalate are described. The blends have the advantage of being miscible (visually clear) and remaining clear after post-extrusion heat histories.

21 Claims, 8 Drawing Sheets

(56) References Cited

U.S. PATENT DOCUMENTS

| | | |
|---|---|---|
| 5,628,957 A | 5/1997 | Collette et al. |
| 5,859,116 A | 1/1999 | Shih |
| 5,952,066 A | 9/1999 | Schmidt et al. |
| 5,976,653 A | 11/1999 | Collette et al. |
| 6,025,069 A * | 2/2000 | Eckart et al. ............... 428/339 |
| 6,576,309 B2 | 6/2003 | Dalgewicz, III et al. |
| 6,599,994 B2 | 7/2003 | Shelby et al. |
| 6,855,778 B2 | 2/2005 | Yanuzzi et al. |
| 7,003,930 B2 | 2/2006 | Yanuzzi et al. |
| 2001/0008240 A1 | 7/2001 | Herrin |
| 2003/0106287 A1 | 6/2003 | Yanuzzi et al. |
| 2003/0203140 A1 | 10/2003 | Sapatova et al. |
| 2005/0037168 A1 | 2/2005 | Dalgewicz |
| 2005/0097864 A1 | 5/2005 | Yanuzzi et al. |
| 2005/0182167 A1 | 8/2005 | Goodson et al. |
| 2006/0073298 A1 | 4/2006 | Hutchinson et al. |
| 2006/0105166 A1 | 5/2006 | Lischefski et al. |
| 2007/0052131 A1 | 3/2007 | Fujimaki et al. |
| 2007/0066708 A1 | 3/2007 | Goldacker et al. |
| 2007/0110933 A1 | 5/2007 | Share |

FOREIGN PATENT DOCUMENTS

| | | |
|---|---|---|
| EP | 1741550 A1 | 1/2007 |
| WO | WO 9213033 A1 * | 8/1992 |
| WO | WO 95/16554 A1 | 6/1995 |
| WO | WO 2005/014409 A1 | 2/2005 |
| WO | WO 2005/102668 A2 | 11/2005 |

OTHER PUBLICATIONS

Mohn, R.N., et al., "Polyester-Polycarbonate Blends. III. Polyesters Based on 1,4-Cyclohexanedimethanol/Terephthalic Acid/Isophthalic Acid," Journal of Applied Polymer Science, 1979, pp. 575-587, vol. 23, John Wiley & Sons, Inc.

* cited by examiner

MISCIBLE POLYESTER BLENDS UTILIZING RECYCLED POLYESTERS

FIELD OF THE INVENTION

The invention generally relates to the field of polyester blends and, in particular, to miscible polyester blends containing recycled polyesters.

BACKGROUND OF THE INVENTION

Conservation or sustainability is growing in acceptance worldwide, particularly in both Europe and North America. One aspect of sustainability is material recycling to slow landfill growth.

For decorative laminates used in new construction and major renovations, LEED certification, offered by the US Green Building Council, is a desired accreditation. Thus, entities in the field seek to offer a LEED-certifiable product, preferably with post-consumer recycled material sourcing. It is difficult, however, for these entities to incorporate 100% recycled polyethylene terephthalate (PET) layers into their products because the heat history from the lamination process causes this layer to crystallize—an action that has a detrimental effect on light transmission and impact strength.

Accordingly, there is a need in the art for laminated articles incorporating post-consumer recycled PET without significantly reducing light transmission or impact strength in the final article.

The present invention aims to address this need as well as others that will become apparent from the following description and claims. In particular, the present invention aims to provide materials for decorative laminates that contain recycled PET, but avoid crystallizing after undergoing an extended heat history from a lamination process.

SUMMARY OF THE INVENTION

In one embodiment, the present invention provides a polyester blend, which comprises:
(a) 10 to 50 weight percent of post-consumer polyethylene terephthalate (RPET);
(b) 30 to 90 weight percent of a PETG copolyester comprising
  (i) a diol component comprising about 31 mole percent of cyclohexanedimethanol (CHDM) residues and about 69 mole percent of ethylene glycol (EG) residues, and
  (ii) a diacid component comprising at least 60 mole percent of terephthalic acid (TA) residues; and
(c) 0 to 60 weight percent of a PCTG(62) copolyester comprising
  (i) a diol component comprising about 62 mole percent of CHDM residues and about 38 mole percent of EG residues; and
  (ii) a diacid component comprising at least 60 mole percent of TA residues,
wherein the sum of RPET, PETG, and PCTG(62) equals 100 weight percent; and
wherein the RPET, PETG, and PCTG(62) are present in an amount such that the blend is miscible and the total amount of CHDM residues in the blend ranges from 18 to 46 mole percent, based on the total molar amount of the diol component in the blend.

In another embodiment, the present invention provides a polyester blend, which comprises:
(a) 10 to 60 weight percent of post-consumer polyethylene terephthalate (RPET);
(b) 10 to 90 weight percent of a PETG copolyester comprising
  (i) a diol component comprising about 31 mole percent of cyclohexanedimethanol (CHDM) residues and about 69 mole percent of ethylene glycol (EG) residues, and
  (ii) a diacid component comprising at least 60 mole percent of terephthalic acid (TA) residues; and
(c) 0 to 80 weight percent of a PCTG(50) copolyester comprising
  (i) a diol component comprising about 50 mole percent of CHDM residues and about 50 mole percent of EG residues; and
  (ii) a diacid component comprising at least 60 mole percent of TA residues,
wherein the sum of RPET, PETG, and PCTG(50) equals 100 weight percent; and
wherein the RPET, PETG, and PCTG(50) are present in an amount such that the blend is miscible and the total amount of CHDM residues in the blend ranges from 18 to 46 mole percent, based on the total molar amount of the diol component in the blend.

DETAILED DESCRIPTION OF THE INVENTION

It has been surprisingly found that a 31 mol % cyclohexanedimethanol (CHDM) modified polyethylene terephthalate copolyester (hereinafter PETG or PETG(31)), and other similar copolyesters with less CHDM modification, have infinite miscibility with recycled PET. Although suitable for some applications and still within the scope of the invention, these binary blends have the disadvantages of a dark edge color and of containing an overall CHDM level less than 31 mol % based upon numerical averaging. Copolyesters with 31 mol % CHDM allow the widest process window for processes with extended heat histories because this level of comonomer modification leads to an amorphous composition with the maximum crystallization half-time. To achieve the maximum crystallization half-time in polyester blends that incorporate recycled PET, a ternary blend should be utilized. Acceptable ternary blends include recycled PET, PETG, and either a 50 mol % CHDM-modified PET copolyester (PCTG (50)) or a 62 mol % CHDM-modified PET copolyester (PCTG(62)).

It has also been surprisingly discovered that when two normally immiscible polyesters (e.g., recycled PET with PCTG(62)) or two polyesters with very limited miscibility (e.g., recycled PET with PCTG(50), which are miscible in one another at approximately less than 25 wt %) are mixed, a "miscible" homogeneous composition can be achieved when a third compatibilizing material is incorporated during the melt blending, provided that the third material is individually miscible with each of the two normally immiscible or limited-miscibility polyesters. By combining the miscibility data with the crystallization behavior of these ternary systems, an operating region develops—one that describes compositions suitable for manufacturing thermoplastic articles that remain clear after post-extrusion heat histories.

Miscible blends are defined herein as polymeric blends that do not contain a visibly-detectable level of haze when samples are viewed at various angles both with and without backlighting. In contrast, immiscible blends are defined herein as polymeric blends that do contain a visibly-detectable level of haze when samples are viewed at various angles both with and without backlighting. Haze detectable in any configuration designates that sample as an immiscible blend.

In one embodiment, the present invention provides a polyester blend, which comprises:
(a) 10 to 50 weight percent of post-consumer polyethylene terephthalate (RPET);
(b) 30 to 90 weight percent of a PETG copolyester comprising
    (i) a diol component comprising about 31 mole percent of cyclohexanedimethanol (CHDM) residues and about 69 mole percent of ethylene glycol (EG) residues, and
    (ii) a diacid component comprising at least 60 mole percent of terephthalic acid (TA) residues; and
(c) 0 to 60 weight percent of a PCTG(62) copolyester comprising
    (i) a diol component comprising about 62 mole percent of CHDM residues and about 38 mole percent of EG residues; and
    (ii) a diacid component comprising at least 60 mole percent of TA residues,
wherein the sum of RPET, PETG, and PCTG(62) equals 100 weight percent; and
wherein the RPET, PETG, and PCTG(62) are present in an amount such that the blend is miscible and the total amount of CHDM residues in the blend ranges from 18 to 46 mole percent, based on the total molar amount of the diol component in the blend.

In a preferred embodiment, the polyester blend comprises 20 to 50 weight percent of the RPET, 40 to 80 weight percent of the PETG, and 0 to 40 weight percent of the PCTG(62).

In another preferred embodiment, the RPET, PETG, and PCTG(62) are present in an amount such that the total amount of CHDM residues in the blend ranges from 18 to 37 mole percent.

In another embodiment, the present invention provides a polyester blend, which comprises:
(a) 10 to 60 weight percent of post-consumer polyethylene terephthalate (RPET);
(b) 10 to 90 weight percent of a PETG copolyester comprising
    (i) a diol component comprising about 31 mole percent of cyclohexanedimethanol (CHDM) residues and about 69 mole percent of ethylene glycol (EG) residues, and
    (ii) a diacid component comprising at least 60 mole percent of terephthalic acid (TA) residues; and
(c) 0 to 80 weight percent of a PCTG(50) copolyester comprising
    (i) a diol component comprising about 50 mole percent of CHDM residues and about 50 mole percent of EG residues; and
    (ii) a diacid component comprising at least 60 mole percent of TA residues,
wherein the sum of RPET, PETG, and PCTG(50) equals 100 weight percent; and
wherein the RPET, PETG, and PCTG(50) are present in an amount such that the blend is miscible and the total amount of CHDM residues in the blend ranges from 18 to 46 mole percent, based on the total molar amount of the diol component in the blend.

In a preferred embodiment, the polyester blend comprises 20 to 60 weight percent of the RPET, 10 to 80 weight percent of the PETG, and 0 to 70 weight percent of the PCTG(50).

In another preferred embodiment, the RPET, PETG, and PCTG(50) are present in an amount such that the total amount of CHDM residues in the blend ranges from 18 to 37 mole percent.

There is no limitation on the RPET that may be used in the blends of the invention. The RPET may be purchased commercially from various sources, typically in the form of flakes. The RPET may have minor modifications such as with up to 5 mole % of isophthalic acid and/or up to 5 mole % of CHDM or other diol.

There is no limitation on the PETG that may be used in the blends of the invention. In addition to modification by CHDM, the PETG may be modified with up to 40 mole % of isophthalic acid, based on the mole percent of the diacid component. PETG may be obtained commercially such as from Eastman Chemical Company under the brand name SPECTAR.

There is no limitation on the PCTG(62) that may be used in the blends of the invention. In addition to modification by CHDM, the PCTG(62) may be modified with up to 40 mole % of isophthalic acid, based on the mole percent of the diacid component. PCTG(62) may be obtained commercially such as from Eastman Chemical Company under the brand name TiGLAZE ST.

There is no limitation on the PCTG(50) that may be used in the blends of the invention. In addition to modification by CHDM, the PCTG(50) may be modified with up to 40 mole % of isophthalic acid, based on the mole percent of the diacid component. PCTG(50) may be obtained commercially such as from Eastman Chemical Company under the brand name EB062.

The inherent viscosities (IV) of the RPET, PETG, PCT (50), and PCTG(62) as well as the resulting blends according to the invention may vary over a wide range. For example, the individual Ns as well as that of the blends can range from 0.57 to 0.90 dL/g. The IV of the RPET, in some instances, can be even higher such as up to 1.1 dL/g or greater.

The blends of the invention may be formed by conventional melt blending techniques. For example, RPET flakes and pellets of PETG and PCTG(62) or PCTG(50) may be dried to a moisture level below 500 ppm, and then mixed and melt blended in a single- or twin-screw extruder to form a homogeneous mixture.

The blends of the invention may contain impact modifiers, stabilizers, nucleating agents, extenders, flame retarding agents, reinforcing agents, fillers, antistatic agents, antimicrobial agents, antifungal agents, self-cleaning or low surface energy agents, mold release agents, scents, colorants, antioxidants, extrusion aids, slip agents, release agents, carbon black, and other pigments, and the like, and mixtures thereof, which are known in the art for their utility in polyester blends.

In an alternative embodiment, the blends of the invention comprise RPET, PETG(31), and optionally PCTG(62). The relative amounts of RPET, PETG(31), and PCTG(62) are defined by the operating region bound by the following coordinates when plotted on a ternary, equilateral triangle diagram: (35,47,18); (48,42,10); (40,60,0); (10,90,0); (10,30,60); (20,43,37); and (35,47,18), where the coordinate compositions are of RPET, PETG(31), and PCTG(62), respectively. The relative concentrations of RPET, PETG(31), and PCTG(62) within this region can provide blends that yield articles that remain clear after being subjected to a heat history from secondary processing.

This same operating region can be described on the ternary diagram as being bound by compositions having an average polyester blend CHDM content ranging from 18 to 46 mol %, at least 10 wt % of RPET, a line joining the binary combinations of PETG(31) and RPET with RPET contents between 10 and 40 wt %, and the following three equations (plotted in Cartesian space):

$$RPET\ content\ wt\ \% = 0.0242*(Average\ mol\ \%\ CHDM)^2 - 3.0121*(Average\ mol\ \%\ CHDM) + 97.233 \quad (1)$$

$$PETG(31)\ content\ wt\ \% = -0.0485*(Average\ mol\ \%\ CHDM)^2 + 2.7983*(Average\ mol\ \%\ CHDM) + 5.5347 \quad (2)$$

$$PCTG(62)\ content\ wt\ \% = 0.0242*(Average\ mol\ \%\ CHDM)^2 + 0.2137*(Average\ mol\ \%\ CHDM) - 2.7674 \quad (3)$$

In another alternative embodiment, the blends of the invention comprise RPET, PETG(31), and optionally PCTG(50). The relative amounts of RPET, PETG(31), and PCTG(50) are defined by the operating region bound by the following coordinates when plotted on a ternary, equilateral triangle diagram: (60,10,30); (40,60,0); (10,90,0); and (10,10,80) where the coordinate compositions are of RPET, PETG(31), and PCTG(50), respectively. The relative concentrations of RPET, PETG(31), and PCTG(50) within this region can provide blends that yield articles that remain clear after being subjected to a heat history from secondary processing.

Surprisingly, the blends of the invention are clear and can yield films, sheets, or molded articles that remain clear after undergoing post-extrusion heat histories, such as spending a minimum of 15 minutes at a temperature of at least 110° C.

The blends of the invention may be formed into films, sheets, or molded articles according to methods known in the art.

In a preferred embodiment, the blends of the invention in the form of films or sheets may undergo a thermocompressive lamination procedure with one or more layers of a decorative or functional material to form a laminate.

The decorative and functional laminates may include adhesion to the surface of one or more, or encapsulation between two or more, layers of clear thermoplastic film or sheet containing a blend of copolyesters and recycled PET where the article to be adhered or encapsulated include, but is not limited to, fabric, metallic wire, rod, bar, wood, stone, paper, printed images, vegetation, wood, wood chips, grasses, thatch, flowers, flower petals, wheat, grains, natural papers, glass, crushed glass, pebbles, and the like, or at least one electrically energized device comprising light emitting capacitors (LEC's), light emitting diodes (LED's), printed "circuit boards" or paper that emit light when energized, electrochromic layers, photovoltaics, transmitters, receivers, antennas, electromagnets, electrodes and smart sensors capable of detecting wind speed and direction, temperature, pressure, relative humidity, rainfall, motion, radiation, specific chemical species or combinations thereof, and the like.

The laminate can be made from sheet material from which the upper (or outer) layer or surface is formed generally has a thickness in the range of about 0.015-0.500 inch, preferably in the range of about 0.050-0.250 inch. The sheet material from which the lower (or backing) layer or surface is formed typically has a thickness in the range of 0.015-0.500 inch, preferably in the range of about 0.050-0.250 inch.

A typical thermocompressive lamination procedure may include placing a "book" of articles to be laminated in a heated press and applying sufficient temperature and pressure to cause the upper or lower sheet materials to bond (or fuse) around the object being encapsulated. For example, platen temperatures of about 80 to 300° C. and a pressure of about 5 to 400 pounds per square inch may be used for a cycle time of about 2 to 100 minutes, where the temperature and pressure depend on the characteristics of the encapsulant or inclusion and the length of the cycle time depends on the thickness of the article being laminated and the total number of articles being laminated when stacked together (called a "book") in one press opening.

A typical layup for the book may include the following layers: a metallic transfer plate; a pressure distribution pad (rubber silicone, paper corrugation, thermally-stable fabric, etc.); a thin metallic "caul" plate; a release film or paper; an optional thin clear extruded copolyester film containing a UV additive with a matte texture oriented upward to prevent air entrapment; a sheet utilizing a blend of copolyesters with recycled PET, as described herein, with matte surface upward; a decorative or functional layer to be encapsulated; and repeating the layers in reverse to complete the layup to make one laminated structure. Note that a book can be constructed such that several laminates are manufactured in one press opening.

The laminate, based on the blends of the invention, can be subsequently shaped, line-bent, thermoformed, or drape-formed into a variety of other useful products. As an illustrative example, the laminate can be thermoformed or otherwise shaped into skylights, curved signage, backlit instrument panels, cellular phone panels, computer keyboards, safety vests, flooring, shower doors, privacy partitions, and tabletops, and other furniture pieces.

The term "about" has been used herein to account for variations in manufacturing as well as measurement techniques. It is also intended to include minor modifications in composition that do not materially affect the qualities and/or properties of the final product.

This invention can be further illustrated by the following examples of preferred embodiments thereof, although it will be understood that these examples are included merely for purposes of illustration and are not intended to limit the scope of the invention.

EXAMPLES

Examples 1 through 47 below involved manufacturing samples to determine the miscibility of various polyester blends by noting the presence of haze. The tabular miscibility data was then combined into a ternary diagram.

Examples 48 through 52 below involved taking some of the miscible combinations identified in previous examples and subjecting them to various heat histories to determine the onset of crystallization, also noted by the presence of haze.

The miscibility data from Examples 1 through 47 was combined with the crystallization data from Examples 48 through 52 to form an operating region for polyester blends that defines thermoplastic articles that remain clear after an extended heat history.

Examples 53 through 62 below then describe specific techniques for manufacturing useful articles according to the operating regions for polyester blends shown in Examples 48 through 52.

Materials

Various commercially-available polyester resins were melt blended in the examples below. The properties of these materials are listed in Table 1 below.

TABLE 1

| Polyester Material | Diol Component | | Diacid Component | | Inherent Viscosity (dL/g) |
|---|---|---|---|---|---|
| | Ethylene Glycol Residues (mol %) | CHDM Residues (mol %) | Terephthalic Acid Residues (mol %) | Isophthalic Acid Residues (mol %) | |
| PCTG(62) | 38 | 62 | 100 | 0 | 0.767 |
| PCTG(50) | 50 | 50 | 100 | 0 | 0.813 |
| PETG(31) | 69 | 31 | 100 | 0 | 0.794 |
| PETG(12) | 88 | 12 | 100 | 0 | 0.721 |
| PET | 100 | 0 | 98.3 | 1.7 | 0.841 |
| Post-Consumer Recycled PET (RPET) | 100 | 0 | 98 | 2 | 0.825 |

The polyester composition analysis was performed by 1H NMR Spectrometry where the spectra were recorded on a JEOL Eclipse 600 MHz spectrometer using a 70/30 (v/v) mixture of chloroform-d and trifluoroacetic acid and where 64 scans were taken using a 90 degree pulse and a 15 second relaxation delay. The inherent viscosities were measured at 25° C. by dissolving 0.50 g of the polyester in 100 mL of a 60/40 by weight solvent of phenol/tetrachloroethane according to ASTM 4603.

Examples 1-22

In order to assess the miscibility of multi-component polyester blends, clear ¼-inch thick sheets were extruded utilizing various combinations of PETG(31), PCTG(62), PCTG(50), and PET, where PET is a commercial resin used in carbonated soft drink bottle applications and is representative of the resin available as post-consumer recycled PET. The sheet samples were made by drying the individual components separately, then mixing them in an extruder—a 3.5-inch vented Breyer extrusion line with a L/D of 32:1. The extrusion conditions included a temperature set point of about 520° F., which resulted in a polymer melt temperature of about 555° F. at a production rate of approximately 800 pounds per hour. The materials were extruded out a 54" coat hanger die onto a 3 roll stack configuration. The roll temperatures were set to cool the sheet while minimizing stress.

These samples were then visually inspected to assess the presence of haze (a whitish cast or hue), which is an indication of an immiscible polymer blend. Miscible blends are, therefore, defined in Examples 1-47 as polymeric blends that do not contain a visibly-detectable level of haze when samples are viewed at various angles both with and without backlighting. In contrast, immiscible blends are, therefore, defined in Examples 1-47 as polymeric blends that do contain a visibly-detectable level of haze when samples are viewed at various angles both with and without backlighting (both reflected and transmitted light is used to detect haze). Haze detectable in any configuration designates that sample as an immiscible blend.

The component combinations and miscibility results are reported in Table 2 below.

TABLE 2

| Example No. | PET (wt %) | PETG(31) (wt %) | PCTG(50) (wt %) | PCTG(62) (wt %) | Avg. Level of CHDM in Blend (mol %) | Visual Haze Assessment |
|---|---|---|---|---|---|---|
| 1 | 55 | 35 | 0 | 10 | 17.1 | slightly hazy |
| 2 | 48 | 45 | 0 | 7 | 18.3 | no haze |
| 3 | 40 | 60 | 0 | 0 | 18.6 | no haze |
| 4 | 57 | 3 | 40 | 0 | 20.9 | hazy |
| 5 | 45 | 42 | 0 | 13 | 21.1 | slightly hazy |
| 6 | 50 | 30 | 0 | 20 | 21.7 | hazy |
| 7 | 52 | 8 | 40 | 0 | 22.5 | slightly hazy |
| 8 | 47 | 13 | 40 | 0 | 24.0 | no haze |
| 9 | 20 | 80 | 0 | 0 | 24.8 | no haze |
| 10 | 20 | 50 | 30 | 0 | 30.5 | no haze |
| 11 | 20 | 60 | 0 | 20 | 31.0 | no haze |
| 12 | 0 | 100 | 0 | 0 | 31.0 | no haze |
| 13 | 25 | 50 | 0 | 25 | 31.0 | no haze |
| 14 | 30 | 13 | 57 | 0 | 32.5 | no haze |
| 15 | 30 | 7 | 63 | 0 | 33.7 | slightly hazy |
| 16 | 30 | 0 | 70 | 0 | 35.0 | slightly hazy |
| 17 | 4 | 30 | 66 | 0 | 42.3 | no haze |

TABLE 2-continued

| Example No. | PET (wt %) | PETG(31) (wt %) | PCTG(50 (wt %) | PCTG(62) (wt %) | Avg. Level of CHDM in Blend (mol %) | Visual Haze Assessment |
|---|---|---|---|---|---|---|
| 18 | 7 | 48 | 0 | 45 | 42.8 | no haze |
| 19 | 10 | 25 | 0 | 65 | 48.1 | slightly hazy |
| 20 | 4 | 32 | 0 | 64 | 49.6 | no haze |
| 21 | 0 | 0 | 100 | 0 | 50.0 | no haze |
| 22 | 0 | 0 | 0 | 10 | 62.0 | no haze |

Examples 23-47

In order to assess the miscibility of multi-component polyester blends, clear ¼-inch thick plaques were molded utilizing various combinations of post-consumer recycled PET (available from Phoenix Technologies) and PETG(31), PCTG(62), and PCTG(50). The materials were pre-dried at standard conditions—150° C. for crystalline polymers and 65° C. for amorphous polymers. The crystalline polymers were cooled to 65° C. after drying and physically blended with the amorphous polymers. The blends were then compounded in a Werner Pfleiderer 30-mm co-rotating twin-screw extruder with a 30:1 L/D and a medium shear screw configuration. The materials were compounded at 275° C. setpoint to achieve a melt temperature of about 290° C. at 230 rpms at a rate of 50 lbs/hr.

Depending on the composition, the materials were either dried because they were essentially amorphous or crystallized at 170° C. for 45 minutes. The materials were then molded into 4"×4" plaques on a 90-ton Toyo molding machine. The materials were processed at 260° C., a mold temperature of 23° C., and a cycle time of 60 seconds.

These samples were then visually inspected to assess the presence of haze (a whitish cast or hue) which is an indication of an immiscible polymer blend. The component combinations and miscibility results are reported in Table 3 below.

TABLE 3

| Example No. | Post-Consumer Recycled PET (wt %) | PETG(31) (wt %) | PCTG(50) (wt %) | PCTG(62) (wt %) | Avg. Level of CHDM in Blend (mol %) | Visual Haze Assessment |
|---|---|---|---|---|---|---|
| 23 | 60 | 40 | 0 | 0 | 12.4 | no haze |
| 24 | 50 | 50 | 0 | 0 | 15.5 | no haze |
| 25 | 30 | 70 | 0 | 0 | 21.7 | no haze |
| 26 | 42 | 36 | 0 | 22 | 24.8 | slightly hazy |
| 27 | 47 | 3 | 50 | 0 | 25.9 | hazy |
| 28 | 20 | 70 | 0 | 10 | 27.9 | no haze |
| 29 | 10 | 90 | 0 | 0 | 27.9 | no haze |
| 30 | 40 | 10 | 50 | 0 | 28.1 | no haze |
| 31 | 40 | 20 | 0 | 40 | 31.0 | hazy |
| 32 | 30 | 40 | 0 | 30 | 31.0 | slightly hazy |
| 33 | 30 | 20 | 50 | 0 | 31.2 | no haze |
| 34 | 10 | 70 | 20 | 0 | 31.7 | no haze |
| 35 | 20 | 50 | 0 | 30 | 34.1 | no haze |
| 36 | 22 | 42 | 0 | 36 | 35.3 | slightly hazy |
| 37 | 20 | 0 | 80 | 0 | 40.0 | no haze |
| 38 | 0 | 70 | 0 | 30 | 40.3 | no haze |
| 39 | 20 | 30 | 0 | 50 | 40.3 | slightly hazy |
| 40 | 10 | 20 | 70 | 0 | 41.2 | no haze |
| 41 | 30 | 0 | 0 | 70 | 43.4 | hazy |
| 42 | 13 | 30 | 0 | 57 | 44.6 | slightly hazy |
| 43 | 0 | 55 | 0 | 45 | 45.0 | no haze |
| 44 | 10 | 0 | 90 | 0 | 45.0 | no haze |
| 45 | 20 | 10 | 0 | 70 | 46.5 | hazy |
| 46 | 20 | 0 | 0 | 80 | 49.6 | hazy |
| 47 | 10 | 0 | 0 | 90 | 55.8 | hazy |

Figure 1:
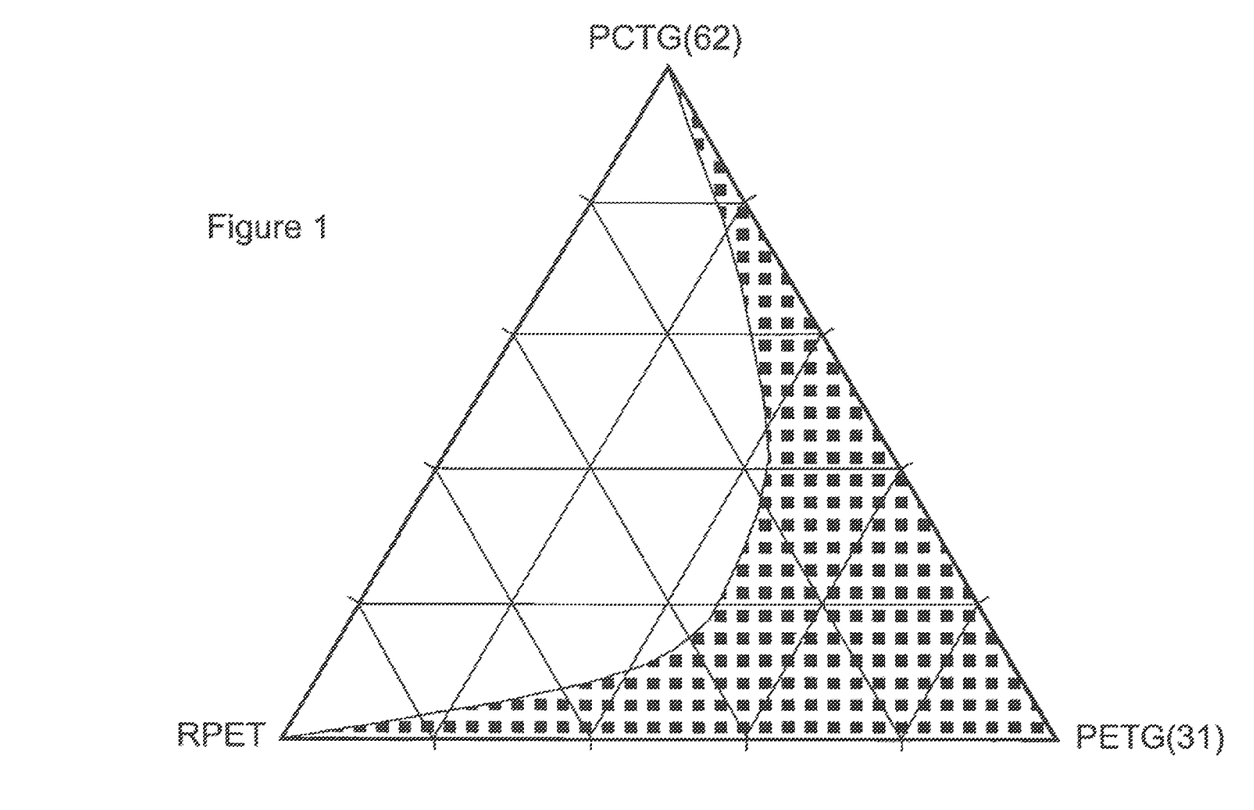
FIG. 1 is a ternary diagram showing the relative percentage of RPET, PETG(31), and PCTG(62) with the dotted region representing miscible blends.
Figure 2:
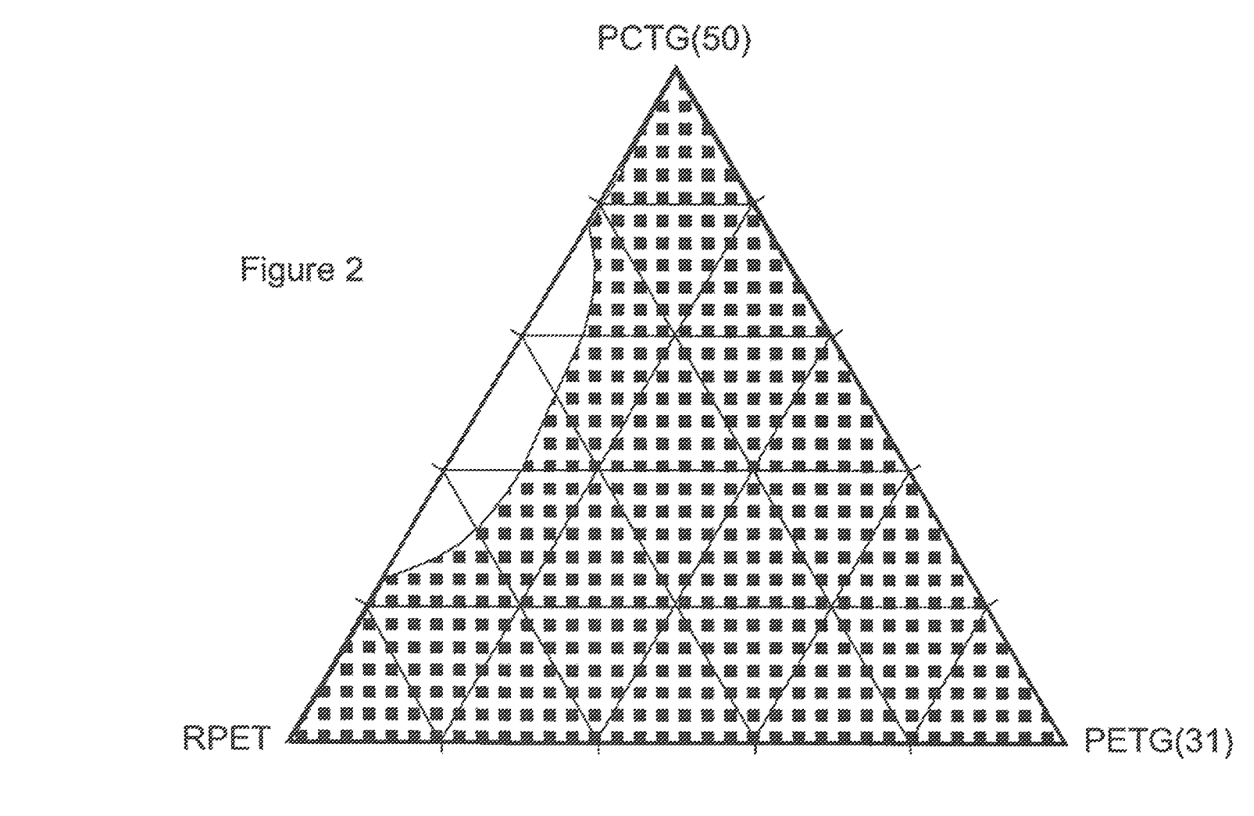
FIG. 2 is a ternary diagram showing the relative percentage of RPET, PETG(31), and PCTG(50) with the dotted region representing miscible blends.

The miscibility results from Examples 1-22 and 23-47 can be more readily understood when combined and viewed in a ternary graphical format as shown in FIGS. 1 and 2.

Note that the non-hazy, miscible range is represented by the dotted region. The graph in FIG. 1 demonstrates that a binary mixture of two normally immiscible polyesters (i.e., post-consumer recycled PET and PCTG(62)) can be melt blended into a miscible composition in the presence of a compatibilizing third material (PETG(31)).

Similarly, the graph in FIG. 2 also demonstrates that a binary mixture of two polyesters with very limited miscibility (i.e., post-consumer recycled PET and PETG(50), which are miscible in one another at approximately less than 25 wt %) can be melt blended into a miscible composition in the presence of a compatibilizing third material (PETG(31)).

Examples 48-52

Certain samples from Examples 1-47 along with additional samples made with PETG(12) (Examples 48-52) according to the procedures described in Examples 1-47 were subjected to extended heat histories from a thermocompressive lamination process to define the boundaries for compositions that turn hazy from heat-induced crystallization.

The component combinations for Examples 48-52 are shown in Table 4 below.

TABLE 4

| Example No. | PETG(12) (wt %) | PETG(31) (wt %) | Avg. Level of CHDM in Blend (mol %) |
|---|---|---|---|
| 48 | 100 | 0 | 12.0 |
| 49 | 75 | 25 | 16.8 |
| 50 | 50 | 50 | 21.5 |
| 51 | 33 | 67 | 24.7 |
| 52 | 25 | 75 | 26.3 |

A 12-inch square layup was assembled according to the following layered arrangement—a layer of blotter paper on bottom, a 60-mil rubber pad, a polished metal caul sheet, a Sappi release paper with a "patent" high gloss finish, a 118-mil extruded sheet sample, a second 118-mil extruded sheet sample (to form a laminate), and continuing this layup pattern in reverse.

The sheet dimensions used were four inch squares so that a total of nine laminated articles could be manufactured from the 12-inch square format. The entire layup was placed in a Carver press at 120° C. platen temperature and 4,000 lb-f (about 25 psi) for 10 minutes. This process was then repeated with a new sheet at 20, 30, 45, 60, 90, and 120 minutes of total lamination time.

The haze percentage was then measured in accordance with ASTM D1003 Method A, Illuminant C using a BYK Gardner Haze-Gard Plus to get indication of heat-induced crystallization resulting from the polymer blend. Since different levels of polymer additives, catalysts, dyes, and the like affect the measured haze value, the change in haze was calculated. The reference point was the 10-minute lamination heat history because this minimal heat history was needed to produce a single, fused laminate from two extruded sheets.

The crystallization-induced haze results are reported in Table 5 below.

TABLE 5

| | Change in Haze Percentage After Extended Heat History from Lamination Processing | | | | | | |
|---|---|---|---|---|---|---|---|
| Example No. | 10 min. | 20 min. | 30 min. | 45 min. | 60 min. | 90 min. | 120 min. |
| 48 | 0.00 | 3.32 | 9.83 | | 99.46 | | 99.46 |
| 49 | 0.00 | 0.96 | 51.87 | | 89.21 | | 89.36 |
| 2 | 0.00 | 0.02 | 5.71 | 37.91 | 87.67 | 94.87 | 93.41 |
| 3 | 0.00 | 0.95 | 2.60 | 36.95 | 69.62 | 96.62 | 95.28 |
| 50 | 0.00 | −0.72 | 4.21 | | 36.37 | | 89.13 |
| 8 | 0.00 | 1.29 | 7.71 | 78.94 | 88.64 | 93.14 | 93.11 |
| 51 | 0.00 | −0.56 | 0.17 | | 6.14 | | 77.39 |
| 9 | 0.00 | −0.37 | −0.48 | −0.43 | −0.37 | 27.25 | 54.87 |
| 52 | 0.00 | −1.06 | −1.46 | | 0.08 | | 24.31 |
| 10 | 0.00 | −0.01 | 0.01 | 0.07 | −0.12 | 0.15 | 5.70 |
| 11 | 0.00 | −0.10 | −0.27 | −0.38 | −0.37 | 0.49 | 7.97 |
| 12 | 0.00 | −0.02 | −0.01 | | 1.04 | −0.09 | −0.05 |
| 13 | 0.00 | −0.39 | −0.41 | 5.77 | 4.01 | 72.07 | 84.4 |
| 14 | 0.00 | 0.30 | −0.29 | 5.51 | 15.31 | 80.04 | 92.61 |
| 38 | 0.00 | −1.71 | −0.83 | | 2.99 | | 24.26 |
| 18 | 0.00 | −1.25 | −1.11 | −1.37 | −1.05 | 2.01 | 6.08 |
| 43 | 0.00 | −1.47 | −1.35 | | 6.04 | | 65.22 |
| 20 | 0.00 | 2.40 | 0.55 | −1.21 | 6.14 | 19.24 | 45.31 |
| 21 | 0.00 | −0.29 | −0.57 | | −0.13 | | 1.15 |
| 47 | 0.00 | 1.93 | 6.41 | | 68.23 | | 94.52 |
| 22 | 0.00 | −1.23 | −0.95 | | 57.63 | | 97.96 |

Figure 3:
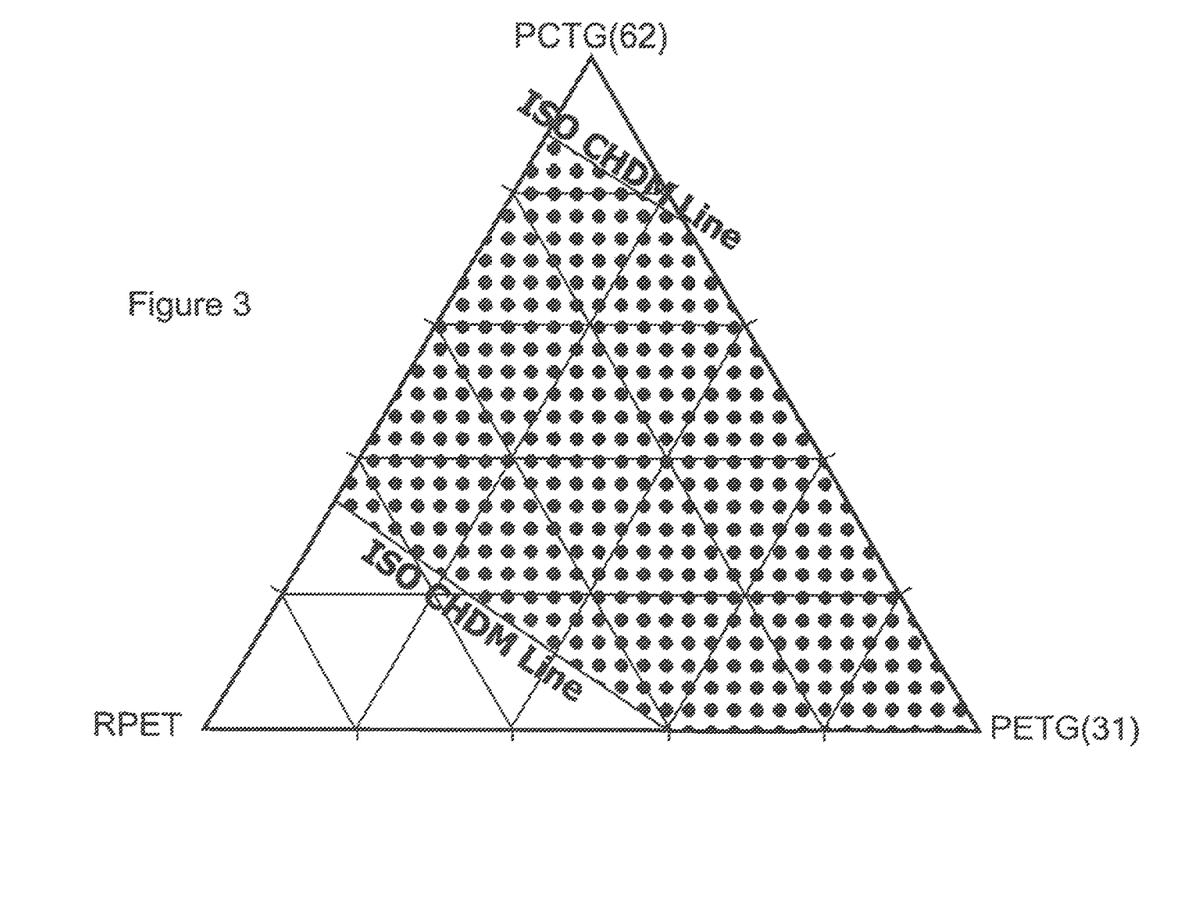
FIG. 3 is a ternary diagram showing the relative percentage of RPET, PETG(31), and PCTG(62) with the dotted region representing non-crystallized blends.
Figure 4:
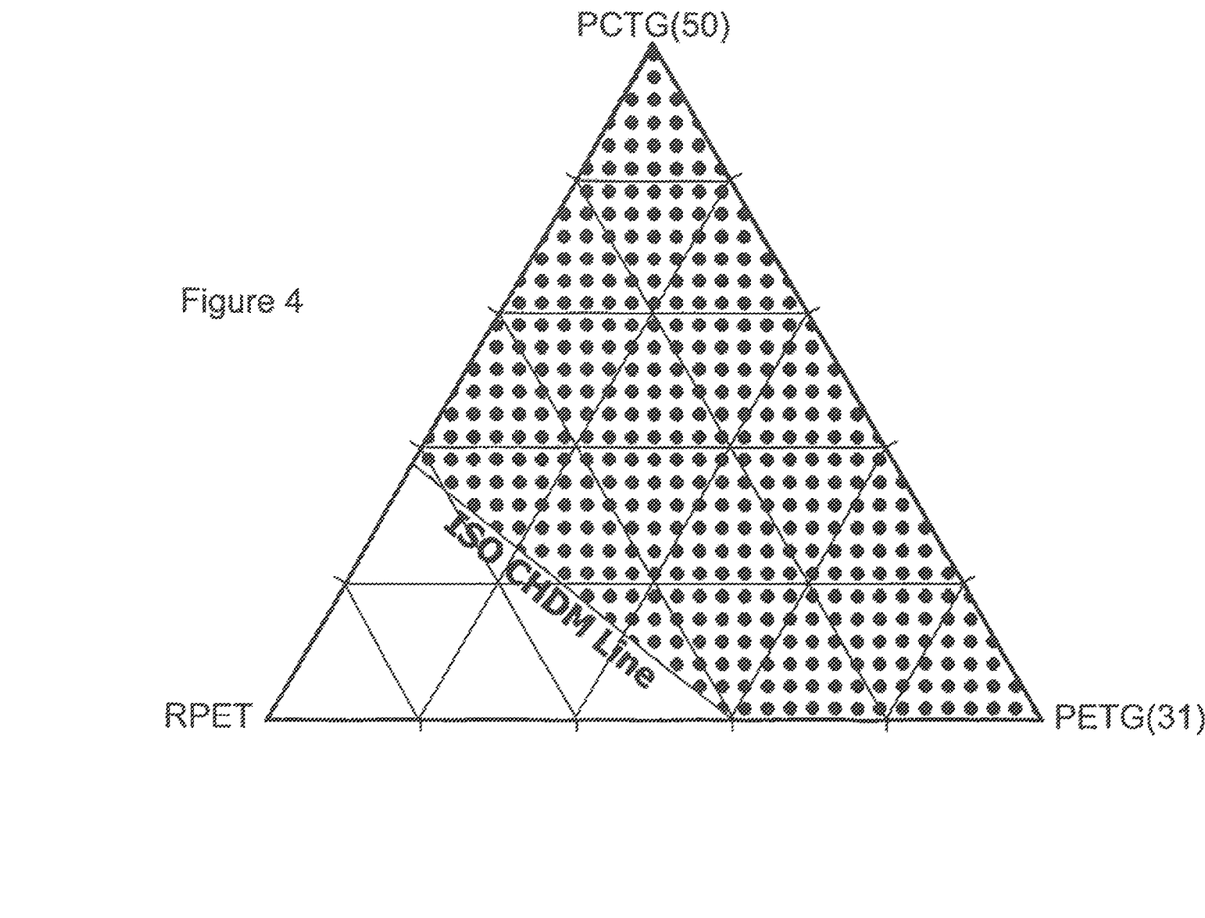
FIG. 4 is a ternary diagram showing the relative percentage of RPET, PETG(31), and PCTG(50) with the dotted region representing non-crystallized blends.

The crystallization results in Table 5 are shown in a ternary graphical format in FIGS. 3 and 4.

Note that the non-hazy, non-crystallized range is represented by the cross-hatched region in both ternary diagrams. In each case, the crystallization-induced haze occurs along an isotropic or "iso-CHDM" line—a line on the ternary diagram that represents the various blend compositions that result in the same average CHDM composition. For lamination heat histories where the polymer blend experienced a temperature of about 120° C. for about 30 minutes, the lower iso-CHDM line occurred at about 18% CHDM. Under the same processing conditions, the upper iso-CHDM line occurred at about 55% CHDM. Commercially-manufactured homopolymers would be expected to slightly exceed these identified CHDM limits (as shown by the homopolymer sheet extruded from PCTG(62) as seen in the table above), but polymer blends without a significant level of transesterification are approximately bound by the 18% and 55% CHDM levels.

Figure 5:
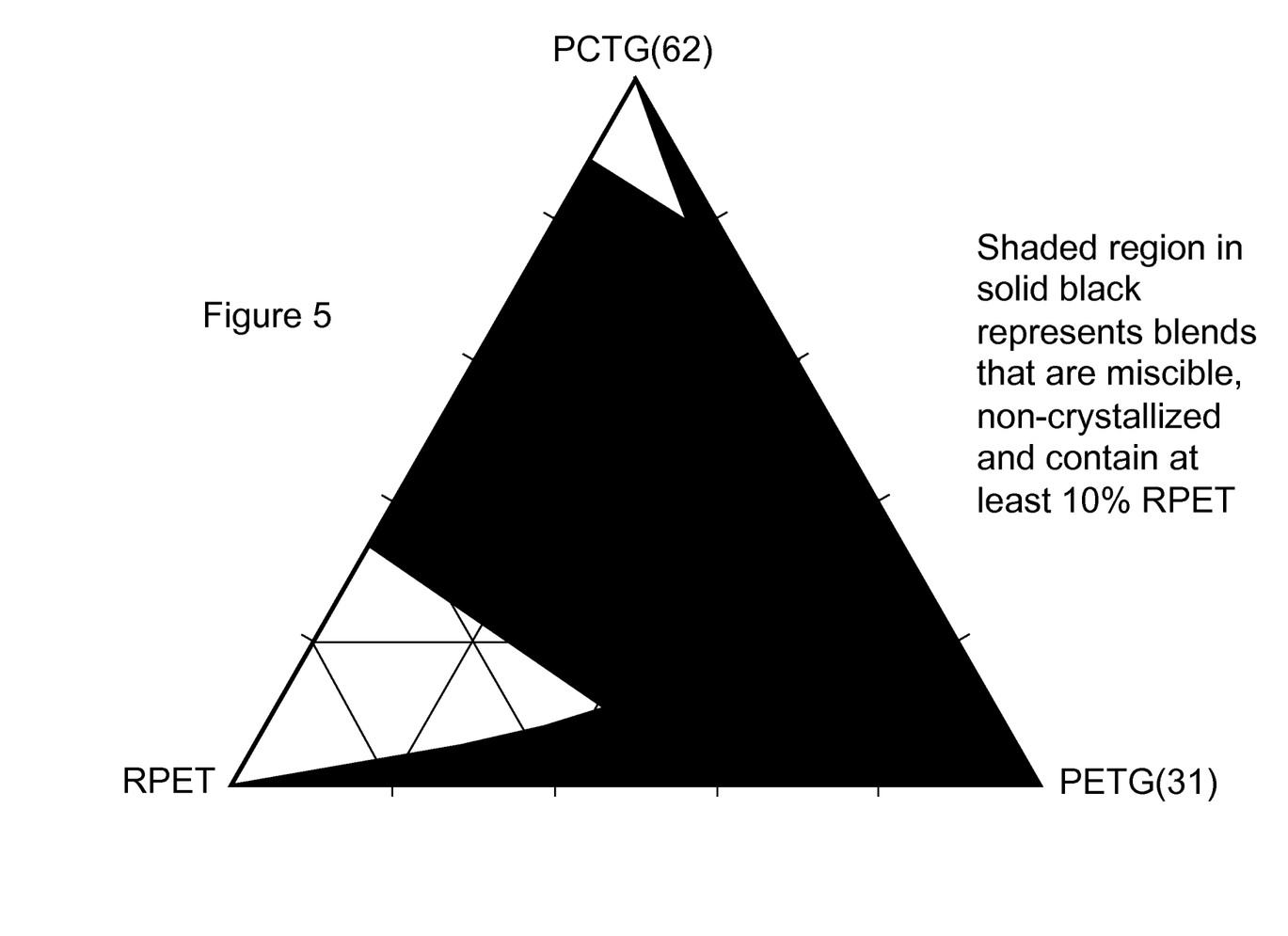
FIG. 5 is a ternary diagram showing the relative percentage of RPET, PETG(31), and PCTG(62) with the solid-shaded region representing miscible, non-crystallized blends having a minimum of 10 wt % of RPET.
Figure 6:
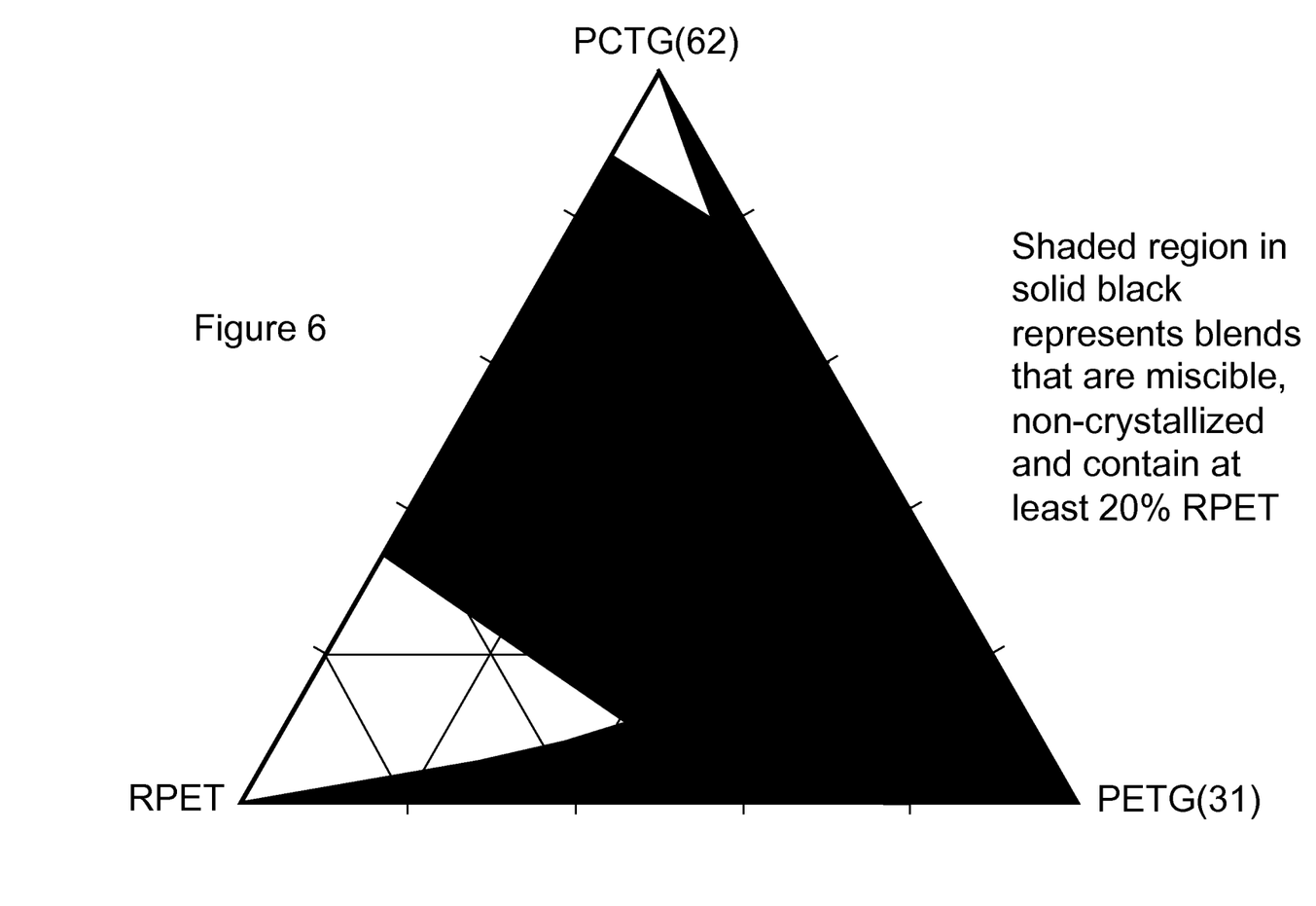
FIG. 6 is a ternary diagram showing the relative percentage of RPET, PETG(31), and PCTG(62) with the solid-shaded region representing miscible, non-crystallized blends having a minimum of 20 wt % of RPET.
Figure 7:
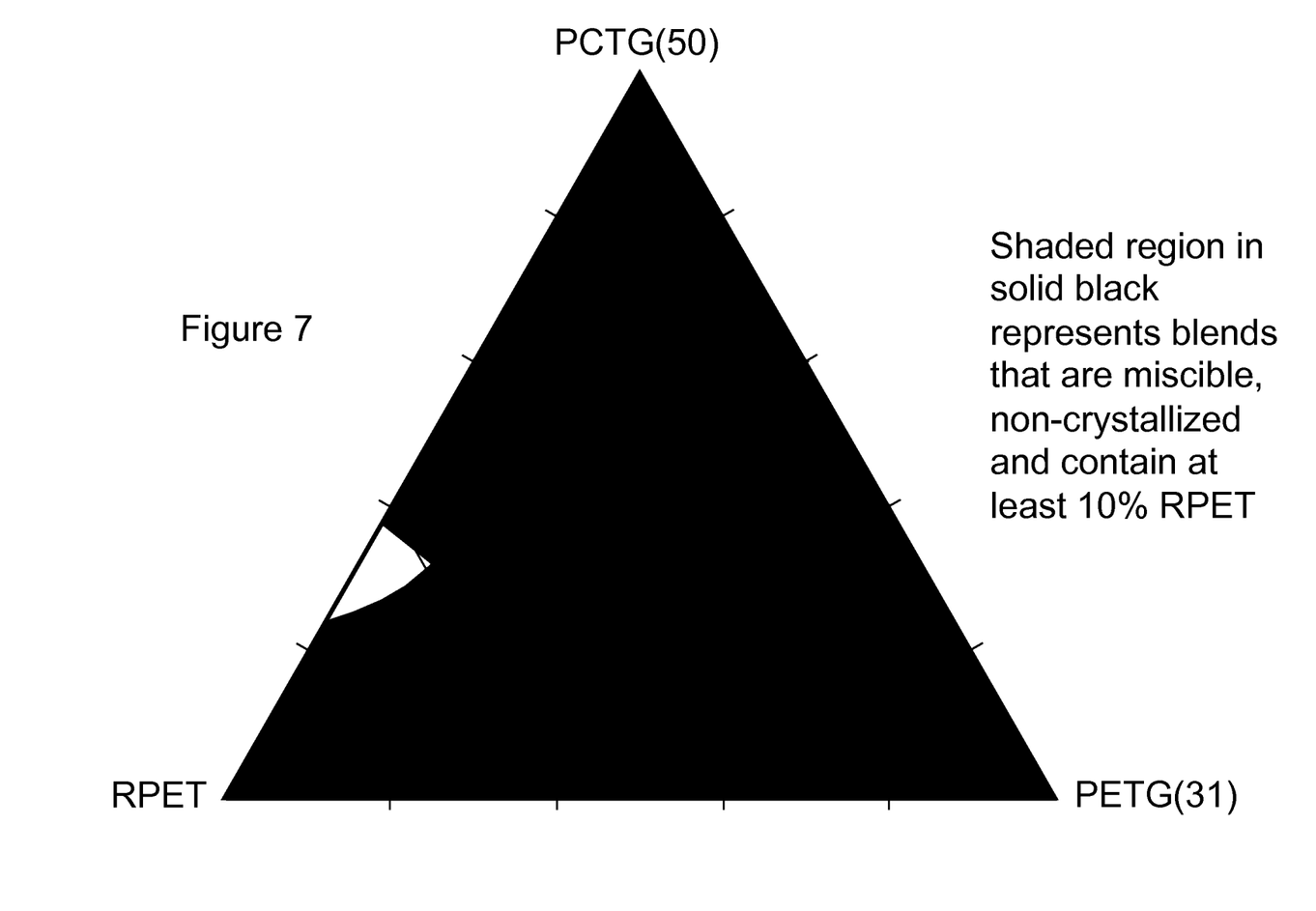
FIG. 7 is a ternary diagram showing the relative percentage of RPET, PETG(31), and PCTG(50) with the solid-shaded region representing miscible, non-crystallized blends having a minimum of 10 wt % of RPET.
Figure 8:
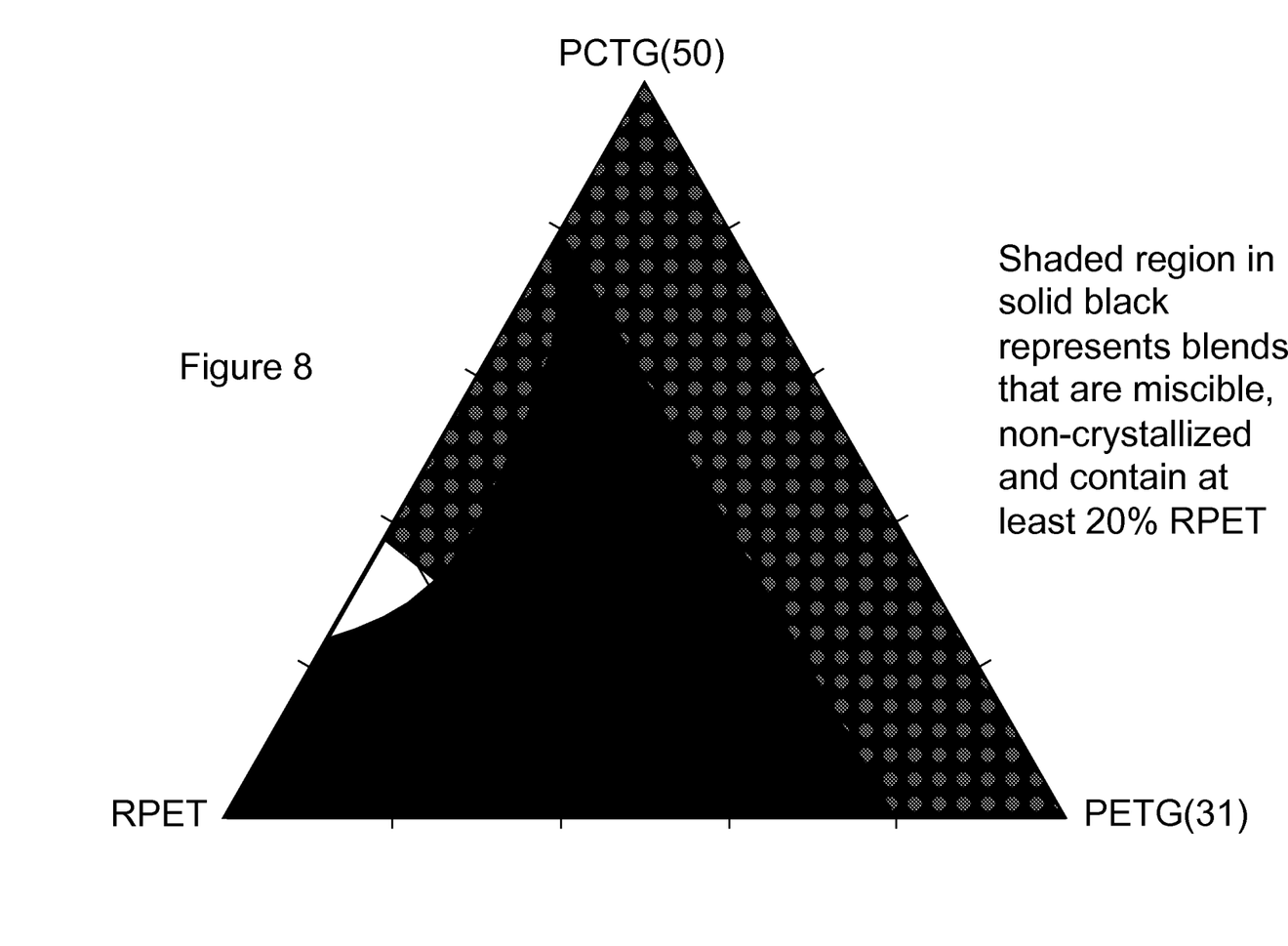
FIG. 8 is a ternary diagram showing the relative percentage of RPET, PETG(31), and PCTG(50) with the solid-shaded region representing miscible, non-crystallized blends having a minimum of 20 wt % of RPET.

Combining the data in Examples 1-52 results in defining an operating region (shaded in solid black—see FIGS. 5 through 8) suitable for manufacturing clear, decorative laminated articles with the often-desired post-consumer recycled polymer content. Some of the boundaries for this operating region are formed from haze generation from immiscible polymeric blend combinations whereas other boundaries are due to crystallization-induced haze. A third criteria has been included for illustrative purposes—a minimum of 10% post-consumer recycled PET (FIGS. 5 and 7) and a minimum of 20% post-consumer recycled PET content (FIGS. 6 and 8) as required by the US Green Building Council to obtain the maximum amount of LEED credits.

For samples manufactured according to the conditions described in Examples 1-47, that underwent a heat history as described in Examples 48-52, and that have a minimum of 10% post-consumer recycle content, the operating region for the ternary blend of PCTG(62), PETG(31), and post-consumer recycled PET to produce a clear, thermoplastic article is approximately described by connecting the adjacent points for the boundary conditions shown in Table 6 on a ternary diagram (see FIG. 5):

TABLE 6

| RPET (wt %) | PETG(31) (wt %) | PCTG(62) (wt %) |
|---|---|---|
| 40 | 60 | 0 |
| 48 | 42 | 10 |
| 35 | 47 | 18 |
| 20 | 43 | 37 |
| 10 | 30 | 60 |
| 10 | 90 | 0 |

For samples manufactured according to the conditions described in Examples 1-47, that underwent a heat history as described in Examples 48-52, and that have a minimum of 20% post-consumer recycle content, the operating region for the ternary blend of PCTG(62), PETG(31), and post-consumer recycled PET to produce a clear, thermoplastic article is approximately described by connecting the adjacent points for the boundary conditions shown in Table 7 on a ternary diagram (see FIG. 6):

TABLE 7

| RPET (wt %) | PETG(31) (wt %) | PCTG(62) (wt %) |
|---|---|---|
| 40 | 60 | 0 |
| 48 | 42 | 10 |
| 35 | 47 | 18 |
| 20 | 43 | 37 |
| 20 | 80 | 0 |

For samples manufactured according to the conditions described in Examples 1-47, that underwent a heat history as described in Examples 48-52, and that have a minimum of 10% post-consumer recycle content, the operating region for the ternary blend of PCTG(50), PETG(31), and post-consumer recycled PET to produce a clear, thermoplastic article is approximately described by connecting the adjacent points for the boundary conditions shown in Table 8 on a ternary diagram (see FIG. 7):

TABLE 8

| RPET (wt %) | PETG(31) (wt %) | PCTG(50) (wt %) |
|---|---|---|
| 40 | 60 | 0 |
| 59 | 8 | 33 |
| 28 | 7 | 65 |
| 23 | 0 | 77 |
| 10 | 0 | 90 |
| 10 | 90 | 0 |

For samples manufactured according to the conditions described in Examples 1-47, that underwent a heat history as described in Examples 48-52, and that have a minimum of 20% post-consumer recycle content, the operating region for the ternary blend of PCTG(50), PETG(31), and post-consumer recycled PET to produce a clear, thermoplastic article is approximately described by connecting the adjacent points for the boundary conditions shown in Table 9 on a ternary diagram (see FIG. 8):

TABLE 9

| RPET (wt %) | PETG(31) (wt %) | PCTG(50) (wt %) |
|---|---|---|
| 40 | 60 | 0 |
| 59 | 8 | 33 |
| 28 | 7 | 65 |
| 23 | 0 | 77 |
| 20 | 0 | 80 |
| 20 | 80 | 0 |

Example 53

A clear sheet was extruded according to the processing conditions described in Examples 1-22 with a composition of 60 wt % of PETG(31), 20 wt % of PCTG(62), and 20 wt % of post-consumer recycled PET, like the composition in Example 11.

The following layup was then constructed: a layer of blotter paper on bottom; a 60-mil rubber pad; a polished metal caul sheet; Sappi release paper with a "patina" textured finish; a 60-mil extruded sheet described above; a layer of "fossil leaf" botanicals arranged in a decorative pattern; a 60-mil extruded sheet; a layer of fossil leaves; a 60-mil extruded sheet; a Sappi release paper with a "patina" textured finish; a polished metal caul sheet; a 60-mil rubber pad; and a layer of blotter paper.

The layup was placed in a Carver press with 120° C. platens and a ram force of 10,000 lb-f (about 70 psi) for 15 minutes. The heat was then turned off and cooling water was turned on until the interfacial laminate temperature reached about 130° F. or below. The laminate was removed from the layup, and a clear, defect-free, decorative laminate with 20% post-consumer recycled PET was obtained.

Note that the multiple layers of botanicals in the structure gave a three dimensional visual effect. Further note that 20% post-consumer recycle content would gain the maximum number of LEED credits—an environmental-based certification for new building constructions and major renovations.

Example 54

Prophetic

A clear sheet is extruded according to the processing conditions described in Examples 1-22 with a composition of 60 wt % of PETG(31) (virgin material sourcing), 20 wt % of PETG(31) (post-industrial material sourcing), 10 wt % of PCTG(62), and 10 wt % of post-consumer recycled PET.

Use the layup described in Example 53 to make a laminate.

The laminate is removed from the layup, and a clear, defect-free, decorative laminate with 10% post-consumer recycled PET and 20% post-industrial material is obtained.

Note that this compositional assembly may be more desirable in some instances than the one in Example 53 because the overall sheet color would have less variability due to the lower post-consumer recycle content. This composition would also still qualify for the maximum number of LEED credits as described in Example 53, since "half" credit is given for post-industrial material sourcing.

Example 55

A clear sheet was extruded according to the processing conditions described in Examples 1-22 with a composition of 50 wt % of PETG(31), 30 wt % of PCTG(50) (of post-industrial sourcing), and 20 wt % of post-consumer recycled PET, like the composition in Example 10.

The following layup was then constructed: a layer of cardboard corrugation padding; a polished caul sheet; a Sappi release paper with a 'patent' high gloss finish; a 60-mil extruded sheet sample with a matte pattern facing upward to prevent air entrapment; a 8 inch×10 inch×0.025 inch thick light emitting capacitor (available from CeeLite) with a 25-mil thick layer of PETG(31) film "shimming material" surrounding the perimeter of the light; and continuing this layup pattern in reverse.

The book was placed in a Carver press with 107° C. platens and a ram force of 6,500 lb-f (about 45 psi) for 30 minutes. The heat was then turned off and cooling water was turned on until the interfacial laminate temperature reached about 130° F. or below.

The laminate was removed from the layup, and a clear, defect-free, encapsulated light panel was obtained with 50% recycled content (20% post-consumer recycled PET and 30% post-industrial content PCTG(50)).

Example 56

Two clear sheets were extruded according to the processing conditions described in Examples 1-22. The first sheet had a composition of 60 wt % of PETG(31) copolyester and 40 wt % of post-consumer recycled PET (like Example 3). The second sheet had a composition of 100 wt % of PETG(31) (like Example 12).

The following layup was then constructed: a layer of cardboard corrugation padding; a polished caul sheet; a Sappi release paper with a "patent" high gloss finish; a 60-mil extruded first sheet with a matte pattern facing upward to prevent air entrapment; a 30 inch×140 inch×0.025 inch thick light emitting capacitor (available from CeeLite and made by splicing two LEC's together of dimensions 30 inch×70 inch× 0.025 inch) with the illuminated side facing upward, with a 25-mil thick layer of PETG(31) film "shimming material" surrounding the perimeter of the light; a 60-mil extruded second sheet; a Sappi release paper; a caul sheet; and corrugation padding.

The book was placed in a Carver press with 107° C. platens and a ram force of 6,500 lb-f (about 45 psi) for 30 minutes. The heat was then turned off and cooling water was turned on until the interfacial laminate temperature reaches about 130° F. or below.

The laminate was removed from the layup, and a clear, defect-free, encapsulated light panel was obtained with a total of about 20% recycled content concentrated in the back, non-illuminated side of the LEC.

Example 57

Prophetic

A clear, green tinted sheet is extruded according to the processing conditions described in Examples 1-22 with a composition of 13 wt % post-consumer recycled PET ("clear stream" sourcing), 7 wt % of post-consumer recycled PET ("green stream" sourcing), and 80 wt % of PETG(31).

The following layup is then constructed: a metal transfer plate on bottom; a layer of cardboard corrugation padding; an aluminum caul sheet; a Sappi release paper with a "patent" high gloss finish; a 100-mil extruded sheet with a matte pattern facing upward to prevent air entrapment; a 3-mil decorative film layer with a printed graphic; a 100-mil extruded sheet; a Sappi release paper; a caul sheet; a Sappi release paper; a 100-mil extruded sheet; a 3-mil decorative film; a 100-mil extruded sheet; a Sappi release paper; a caul sheet; a Sappi release paper; a 100-mil extruded sheet; a 3-mil decorative film layer; a 100-mil extruded sheet; a Sappi release paper; a caul sheet; and a layer of cardboard corrugation padding.

The book containing three separate laminates is placed in a Carver press with 260° F. platens and a ram force of 10,000 lb-f (about 70 psi) until the interfacial temperature in the middle laminate reaches 245° F. (about 55 minutes). After a dwell time of five additional minutes at these conditions, the press is opened and the laminates are moved to a different opening in the press that is operating with cooling water. The laminate is cooled until the temperature reaches about 130° F. or lower as needed. The three laminates are clear, defect-free, contain 20% post-consumer recycled PET and are slightly tinted with green to mimic float glass.

Example 58

A clear sheet was extruded according to the processing conditions described in Examples 1-22 with a composition of 80 wt % of PCTG(50) and 20 wt % of post-consumer recycled PET, like the composition of Example 37.

The following layup was then constructed: a layer of blotter paper on bottom; a 60-mil rubber pad; a polished metal caul sheet; a Sappi release paper with a "patina" textured finish; a 60-mil extruded sheet described above; a decorative metal mesh; and continuing this layup pattern in reverse.

The layup was placed in a Carver press with 120° C. platens and a ram force of 10,000 lb-f (about 70 psi) for 15 minutes. The heat was then turned off and cooling water was turned on until the interfacial laminate temperature reaches about 130° F. or below.

The laminate was removed from the layup and a clear, defect-free, decorative laminate with 20% post-consumer recycled PET was obtained.

Example 59

A clear, 155-mil thick sheet was extruded according to the processing conditions described in Examples 1-22 with a composition of 60 wt % of PETG(31), 20 wt % of PCTG(62), and 20 wt % of post-consumer recycled PET, like the composition in Example 11.

The sheet was subsequently heated to 290° F. in a thermoforming oven (took about 5 minutes). The sagging sheet was brought out of the oven and forced over a skylight mold. The part was then cooled for about 4 minutes under forced-air circulation. Even with this additional heat history, the part remained visually clear.

Although the experimental designs focus on the lamination process, the results are applicable to any type of post-extrusion heat history where a clear, thermoplastic article is desired.

The invention has been described in detail with particular reference to preferred embodiments thereof, but it will be understood that variations and modifications can be effected within the spirit and scope of the invention.

We claim:

1. A miscible ternary polyester blend comprising:
    (a) a post-consumer recycled polyethylene terephthalate (RPET):
    (b) a 31 mole % cyclohexanedimethanol-modified polyethylene terephthalate copolyester (PETG); and either
    (c1) a 50 mole % cyclohexanedimethanol-modified polyethylene terephthalate copolyester (PCTG(50)); or
    (c2) a 62 mole % cyclohexanedimethanol-modified polyethylene terephthalate copolyester (PCTG(62)).

2. The blend according to claim 1, wherein the RPET, PETG, and PCT(50) or PCTG(62) are present in an amount such that the blend is miscible and the total amount of cyclohexanedimethanol residues in the blend ranges from 18 to 45 mole percent, based on the total molar amount of diol residues in the blend.

3. The blend according to claim 1, wherein the RPET, PETG, and PCT(50) or PCTG(62) are present in an amount such that the blend is miscible and the total amount of cyclohexanedimethanol residues in the blend ranges from 18 to 37 mole percent, based on the total molar amount of diol residues in the blend.

4. The blend according to claim 1, which comprises PCTG (62).

5. The blend according to claim 4, which comprises 10 to 50 weight % of RPET and 30 to 90 weight % of PETG.

6. The blend according to claim 4, which comprises 20 to 50 weight % of RPET and 40 to 80 weight % of PETG.

7. The blend according to claim 1, comprises PCTG(50).

8. The blend according to claim 7, which comprises 10 to 60 weight % of RPET and 10 to 90 weight % of PETG.

9. The blend according to claim 7, which comprises 20 to 60 weight % of RPET and 10 to 80 weight % of PETG.

10. A film, sheet, or molded article made from the polyester blend according to claim 1.

11. A film, sheet, or molded article made from the polyester blend according to claim 2.

12. A film sheet, or molded article made from the polyester blend according to claim 4.

13. A film, sheet, or molded article made from the polyester blend according to claim 7.

14. A laminate comprising at least one layer of a decorative material and at least one layer made from the polyester blend according to claim 1.

15. A laminate comprising at least one layer of a decorative material and at least one layer made from the polyester blend according to claim 2.

16. A laminate comprising at least one layer of a decorative material and at least one layer made from the polyester blend according to claim 4.

17. A laminate comprising at least one layer of a decorative material and at least one layer made from the polyester blend according to claim 7.

18. The blend according to claim 1, which remains clear after spending a minimum of 15 minutes at a temperature of at least 110° C.

19. The blend according to claim 2, which remains clear after spending a minimum of 15 minutes at a temperature of at least 110° C.

20. The blend according to claim 4, which remains clear after spending a minimum of 15 minutes at a temperature of at least 110° C.

21. The blend according to claim 7, which remains clear after spending a minimum of 15 minutes at a temperature of at least 110° C.

\* \* \* \* \*

UNITED STATES PATENT AND TRADEMARK OFFICE
CERTIFICATE OF CORRECTION

| | |
|---|---|
| PATENT NO. | : 9,074,092 B2 |
| APPLICATION NO. | : 12/973270 |
| DATED | : July 7, 2015 |
| INVENTOR(S) | : Neill et al. |

It is certified that error appears in the above-identified patent and that said Letters Patent is hereby corrected as shown below:

In the claims

Column 16, Line 50, Claim 2 "45" should read -46-

Signed and Sealed this
First Day of December, 2015

Michelle K. Lee
*Director of the United States Patent and Trademark Office*